United States Patent Office 2,742,444
Patented Apr. 17, 1956

2,742,444

SOLUTIONS OF POLYMERS OF VINYLIDENE CHLORIDE

Harry W. Coover, Jr., and Joseph B. Dickey, Kingsport, Tenn., assignors to Eastman Kodak Company, Rochester, N. Y., a corporation of New Jersey No Drawing. Application October 9, 1951,
Serial No. 250,582

1 Claim. (Cl. 260—30.6)

This invention relates to new and important solvents for polyvinylidene chloride and copolymers of vinylidene chloride and useful compositions of matter derived therefrom.

Polyvinylidene chloride and copolymers of vinylidene chloride possess desirable physical properties and chemical properties, such as toughness and insolubility in common solvents. Vinylidene chloride polymers are sufficiently high softening to be useful in the formation of synthetic fibers, yarns, and films. However, effective solvents have not been readily available for these high softening polymers. Further, since these polymers are not stable at temperatures above their melting points, fabrication by melt-extrusion has been precluded. In view of this, the high melting point polymers have not been adapted to ready use.

For the foregoing reasons, the present commercial vinylidene chloride polymers normally consist of copolymers containing 8 per cent to 10 percent or more of a copolymerizable material despite the fact that copolymerization of vinylidene chloride with other monomers results in a lessening of the desirable properties of the polymer, such as high softening point, chemical inertness, resistance to solvents, and so forth.

It accordingly is an object of this invention to provide compounds which are useful in dissolving polymers of vinylidene chloride. A further object is to produce solutions of polyvinylidene chloride or its copolymers, in which at least 95 per cent by weight of the polymer is vinylidene chloride, in solvents which do not react with nor decompose the polymers, the solutions being suitable for the formation of filaments, yarns, films, and other commercially useful articles.

We have now found that certain organic compounds of phosphorous are useful as solvents for polymers of vinylidene chloride, e. g. polyvinylidene chloride and copolymers of vinylidene chloride containing at least 95% by weight of vinylidene chloride.

The organic compounds of phosphorus which are useful in practicing our invention can be represented by the following four formulae:

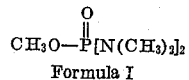 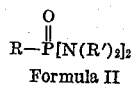

Formula I  Formula II

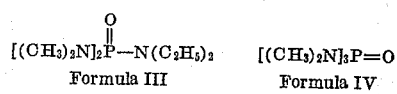

Formula III  Formula IV wherein R represents a member selected from the group consisting of an alkyl group, such as methyl, ethyl, propyl, isopropyl, etc. (i. e. an alkyl group of the formula $C_nH_{2n+1}$ wherein $n$ is a positive integer from 1 to 3, inclusive), and an alkenyl group, such as vinyl, propenyl, isopropenyl, etc. (i. e. an alkenyl group of the formula $C_nH_{2n-1}$ wherein $n$ represents a positive integer from 2 to 3) and R' represents a member selected from the group consisting of methyl and ethyl.

While solvent compounds represented by all of the above-listed formulae have been found of value in the practice of the present invention, we have discovered that those of Formulae I and II, particularly Formula I (methoxy-bis-dimethylaminophosphine oxide) are especially advantageous.

Among the phosphonamides of the Formula II which we have found particularly efficient as solvents for polyvinylidene chloride and copolymers of vinylidene chloride are the N,N,N',N'-tetramethyl diamides of methyl, ethyl, propyl, isopropyl, isopropenyl, propenyl and vinyl phosphonic acids.

Methods for preparation of organic phosphorous compounds herein disclosed as suitable for practice of the invention may be found in Dickey, Stanin and Coover U. S. Patent 2,487,859, dated November 15, 1949, which teaches the utility of certain of these compounds as solvents for polymers of acrylonitrile, Hamilton U. S. Patent 2,382,309, dated August 14, 1945, and in the publication of Michaelis in "Annalen der Chemie," vol. 326 (1903), pp. 129 to 258. Compounds represented by Formula IV are disclosed in the application of Stanin, Coover and Dickey Serial No. 73,234 filed January 27, 1949 now U. S. Patent 2,642,406.

The solvents of this invention are all capable of dissolving polyvinylidene chloride and its copolymers at temperatures below 150° C., and some are capable of forming solutions at room temperature. The solutions are prepared by normal procedures, preferably by mixing the organic phosphorous compound with the polymer and agitating while heating.

The solutions are suitable for forming plastic articles by casting, extruding, or spinning, etc. For instance, transparent films of polymers of vinylidene chloride may be formed by extruding a solution onto a chromium-plated wheel heated to a suitable temperature. After the extruded film is dried in a current of warm air, it may be stripped off the casting wheel and wound up.

Plasticizing or softening agents can be added to the solutions of the polymers. Articles can then be prepared either by extruding the solution into a coagulating bath which does not dissolve the plasticizer or by dry spinning or casting the solution under conditions which do not cause the evaporation of the plasticizer.

Methoxy-bis-dimethylaminophosphine oxide is a colorless liquid boiling at 45 to 46° C./1 mm., and N,N,N',N'-tetramethylmethanephosphonamide boils at 63 to 65° C./2 mm. The boiling point of both bis-(dimethylamino)-diethylaminophosphine oxide and tris-dimethylaminophosphine oxide, both of which are colorless liquids at room temperature, is 68 to 70° C./1 mm. Therefore, the solvents of the invention may be advantageously removed from vinylidene chloride polymer solutions which have been employed for molding, casting, extruding, or dry spinning at drying temperatures in the range of 120° C. to 190° C.

When vinylidene chloride polymer solutions in accordance with the invention are used for wet spinning and the like, suitable compositions for coagulation baths are water, alcohols, acetone, glycols and mixtures of these and other water-soluble organic compounds.

Advantageous amounts of the solvents for preparation of the polymer solutions will be found in the examples given below, but it may be stated that generally a serviceable proportion of the solvent, depending, of course, upon the particular polymeric material, will be within the range of 100 to 2000 parts by weight of the solvent per 100 parts of polymer. However, for certain applications other concentration ranges might be found more satisfactory.

*Example 1.—Wet spun fibers from a solution of polyvinylidene chloride in N,N,N',N'-tetramethylmethane phosphonic acid diamide*

Eight grams of polyvinylidene chloride were dissolved in 35 grams of N,N,N',N'-tetramethylmethane phosphoric acid diamide by heating and stirring at 80° C. The solution was cooled and extruded by a wet spinning process through spinnerets into a water bath. After coagulation the yarn was passed through a drying chamber and then drafted 200 to 300 per cent in a drafting chamber. The drafted yarn had high lustre, strength, and toughness.

*Example 2.—Vinylidene chloride copolymer solution*

A solution of a copolymer of vinylidene chloride and acrylonitrile containing more than 95% vinylidene chloride in the polymer molecule was prepared by adding 10 grams of methoxy-bis-dimethylaminophosphine oxide to 1 gram of the copolymer and stirring while heating to about 50° C. The solution was found suitable for formation of plastic shapes by extrusion.

*Example 3.—Solution of polyvinylidene chloride in N,N,N',N'-tetramethylisopropanephosphonamide*

A solution of polyvinylidenechloride was prepared by adding 10 grams of N,N,N',N'-tetramethylisopropanephosphonamide to 2 grams of the polymer and stirring while heating to about 60° C. The solution was found suitable for formation of plastic shapes by extrusion or coating.

*Example 4.—Plastic casting composition of vinylidene copolymer in methoxy-bis-dimethylaminophosphine oxide*

A solution of a copolymer of vinylidenechloride and methylacrylate containing more than 95 percent vinylidenechloride in the polymer molecule was prepared by adding 10 grams of methoxy-bis-dimethylaminophosphine oxide to 2 grams of the copolymer and stirring while heating to about 30° C. The solution was found suitable for the formation of plastic shapes by casting.

*Example 5.—Solutions of vinylidenechloride copolymers in N,N,N',N' - tetramethyl - N'',N'' - diethylaminophosphine oxide*

A solution of a copolymer of vinylidenechloride and vinyl acetate containing more than 95 percent vinylidenechloride in the polymer molecule was prepared by adding 10 grams of N,N,N',N'-tetramethyl-N'',N''-diethylaminophosphine oxide to 3 grams of the copolymer and stirring while heating at room temperature. The solution was found suitable for the formation of plastic shapes by extrusion or casting.

*Example 6.—Plastic compositions of vinylidenechloride copolymer in N,N,N',N'',N''-hexamethylaminophosphine oxide*

A solution of a copolymer of vinylidenechloride and methacrylonitrile containing more than 95 percent vinylidenechloride in the polymer molecule was prepared by adding 10 grams of N,N,N',N',N'',N''-hexamethylaminophosphine oxide to 1 gram of the copolymer and stirring while heating to about 40° C. The solution was found suitable for the formation of plastic shapes by extrusion.

We claim:

As a new composition of matter, a solution in an organic phosphorous compound of the formula:

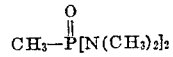

of a polymer of vinylidene chloride containing in the polymer molecule at least 95% by weight of vinylidene chloride.

References Cited in the file of this patent
UNITED STATES PATENTS

| | | |
|---|---|---|
| 2,487,859 | Dickey et al. | Nov. 15, 1949 |
| 2,587,464 | Ham | Feb. 26, 1952 |